Nov. 17, 1970 — R. A. KOSTER — 3,541,521
MULTIPLE RATIO CURSOR CONTROL SYSTEM
Filed Dec. 11, 1967 — 3 Sheets-Sheet 1

INVENTOR.
ROBERT A. KOSTER
BY Lindenberg + Freilich
ATTORNEYS

INVENTOR.
ROBERT A. KOSTER
BY
Lindenberg + Freilich
ATTORNEYS

United States Patent Office 3,541,521
Patented Nov. 17, 1970

3,541,521
MULTIPLE RATIO CURSOR CONTROL SYSTEM
Robert A. Koster, Canoga Park, Calif., assignor to The Bunker-Ramo Corporation, Canoga Park, Calif., a corporation of Delaware
Filed Dec. 11, 1967, Ser. No. 689,706
Int. Cl. G09f 9/00
U.S. Cl. 340—172.5                     18 Claims

ABSTRACT OF THE DISCLOSURE

A system responsive to a manual control means for controlling the movement of a scriber element such as a cathode ray tube beam. The system is useful for enabling an operator to selectively position a symbol (a cursor) on a display surface such as the screen of a cathode ray tube. In order to enable the operator to move the symbol rapidly and position it precisely, the system introduces a selected nonlinear relationship between the movement of the control means and the corresponding movement of the scriber element.

---

The invention herein described was made in the course of or under a contract or subcontract thereunder, with United States Department of the Air Force.

BACKGROUND OF THE INVENTION

Field of the invention

This invention relates generally to control and display apparatus and more particularly to apparatus for enabling an operator to selectively position a symbol on a display surface.

Description of the prior art

U.S. Pat. No. 3,346,853 discloses a control/display apparatus which faciltiates communication between a human operator and a digital computer. The apparatus disclosed therein displays virtually instantaneously data provided by the computer and provides the operator with the facility to modify that data and create new data for submission to the computer. In order to enable the operator to modify old data and create new data, the apparatus incorporates many operator-actuatable devices including a cursor control means. The cursor control means enables the operator to selectively position a cursor, e.g. a pair of cross hairs, at any position on a display surface, e.g. a cathode ray tube screen. The cursor control means includes a manually actuatable device which can, for example, comprise two separate elements which can be moved or rotated to respectively define motion along X and Y display surface axes. Preferably, the manually actuatable device will comprise a single movable device such as a conventional "joy stick" or "bowling ball" together with means for resolving the motion of the device into components along X and Y axes. U.S. Pat. No. 3,304,434 discloses a "bowling ball" type apparatus which develops incremental X and Y axis signals in response to the rotational components of the ball around X and Y axes. The signals developed by the apparatus of U.S. Pat. No. 3,304,434 can be used, as in the apparatus of U.S. Pat. No. 3,346,853, to increment or decrement X and Y coordinate registers to control the deflection of the cathode ray tube beam.

More particularly, in the preferred embodiment disclosed in U.S. Pat. No. 3,346,853, a pair of cursor coordinate registers ($C_x$ and $C_y$) are provided (see FIG. 6 of Patent No. 3,346,853) which can be respectively incremented or decremented in response to signals provided by the cursor control ball. Periodically, e.g. sixty times per second, the contents of the cursor coordinate registers are transferred to X and Y deflection registers to deflect the cathode ray tube beam to the defined cursor position. After the beam has settled at the defined position, the beam is unblanked and the cursor symbol is drawn.

Although prior art cursor control systems, as exemplified by the cited patents, do function to enable an operator to selectively position a symbol on a display surface, they are sometimes considered to be too sluggish when rapid movement is desired or somewhat difficult to control where very precise positioning is desired.

SUMMARY OF THE INVENTION

In view of the foregoing, one object of the present invention is to provide a cursor control system which, at appropriate times, yields either extremely rapid cursor movement or very precise positioning resolution.

Briefly, the present invention is based on the recognition that the deficiencies of prior art cursor control systems are somewhat attributable to the use of a fixed ratio relating the motion of the cursor symbol across the display surface to the output (or motion) of the manual cursor control device. In contrast, in accordance with a significant aspect of the present invention, cursor symbol motion is related to cursor control output by a varying ratio which is dependent upon the rate of cursor control output.

More particularly, in a fixed ratio cursor control system, if the cursor control is moved a distance $d$ along one axis, the cursor symbol would move a distance $Rd$ along the corresponding axis where R represents a fixed or constant ratio. This fixed ratio relationship represents a compromise between positioning resolution and speed of operation. A low ratio (i.e. small R) is desirable for easy, precise positioning of the cursor at a desired point. A high ratio (i.e. large R) is desirable for slewing the cursor or rapidly moving it to a distance point on the display surface.

It has been observed that the typical display apparatus operator moves the cursor control rapidly when he desires to slew the cursor and slowly when he desires to precisely position it. Thus, in accordance with a significant aspect of the present invention, the ratio between cursor motion and control motion or output is automatically shifted as a function of the rate of the cursor control motion or output.

In accordance with a preferred embodiment of the present invention, incremental cursor coordinate registers are provided which are incremented and decremented in response to the movement of the cursor control. The incremental cursor coordinate registers are periodically sampled and reset. Since the sampling is periodic, the counts in the incremental cursor coordinate registers when sampled will be essentially representative of cursor control velocity. A nonlinear function of the count in each incremental cursor coordinate register can then be added to the contents of the corresponding cursor coordinate register to yield a ratio which is a function of control velocity. Any nonlinear function that achieves the desired purpose may be used. As an example, each incremental cursor coordinate register can, when sampled, define a count of 3, 2, 1, 0, —1, —2, —3. A nonlinear encoder can transform these counts to 12, 4, 1, 0, —1, —4, —12 respectively to thus define ratios of 1, 2, or 4 depending upon the cursor control velocity.

Although for the sake of example, reference will be made herein to a movable cursor control means such as the conventional "joy stick" or "bowling ball," it is recognized that the control means need not in fact be perceptibly movable. That is, it will be appreciated that the invention is equally as applicable in systems using a "joy stick" for example which can, without perceptibly moving, sense force exerted by an operator with respect to two substantially orthogonal axes. Such a device would provide an output response (e.g. electrical signals) in response to an applied force. In accordance with the aforementioned significant aspect of the present invention, the cursor symbol motion would be related by a nonlinear function to the control means output response.

It will also be appreciated that although digital devices, e.g. counters, are used in the preferred embodiments disclosed herein, the invention is equally as applicable in a system using equivalent analog devices to, for example, accumulate a representation of control motion, store coordinate information, or perform arithmetic.

The invention will best be understood from the following description when read in conjunction with the accompanying drawings, in which.

Figure 1:
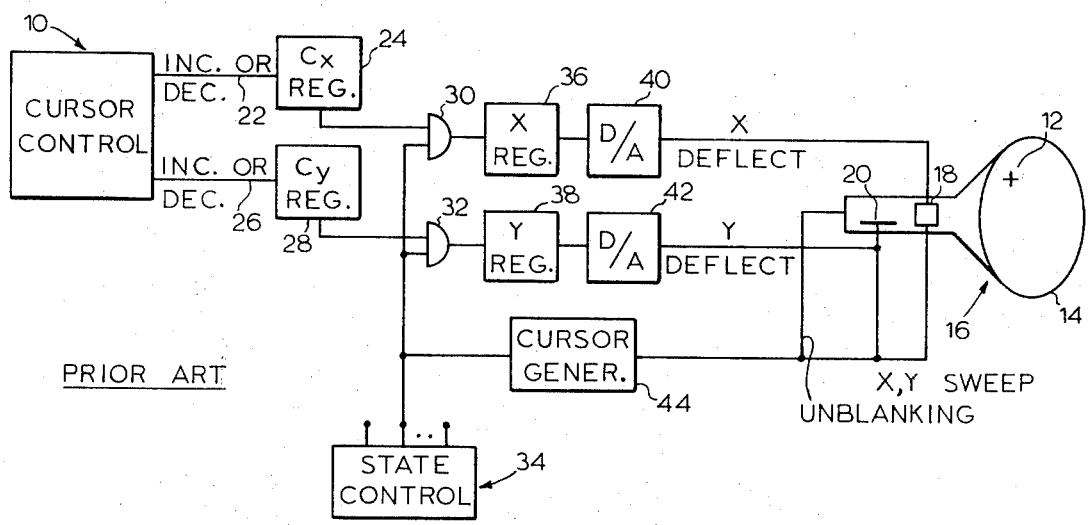
FIG. 1 is a block diagram illustrating an exemplary prior art cursor control system.

Attention is now called to FIG. 1 which illustrates the cursor control system of the type disclosed in U.S. Pat. No. 3,346,853 (particularly FIG. 6 and FIG. 27 theerof). The cursor control system of FIG. 1 is intended to enable an operator to manually operate a cursor control means 10 in order to selectively position a cursor symbol 12 on a display surface 14. Typically, the display surface 14 will comprise the screen of a cathode ray tube 16. The cathode ray tube 16 will include means for generating an electron beam which creates a spot of illumination where it contacts the screen 14. Horizontal deflection means 18 and vertical deflection means 20 are provided for deflecting the beam to any position on the surface 14.

Figure 2:
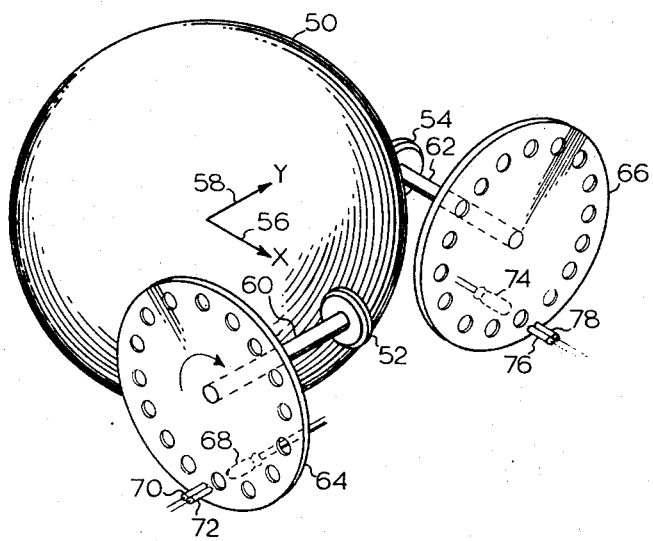
FIG. 2 is a diagrammatic illustration representing an exemplary prior art cursor control means.

As is explained in U.S. Pat. No. 3,346,853, an operator can manipulate a cursor control means 10 in order to move the cursor 12 either horizontally or vertically. As will be explained in greater detail in connection with FIG. 2 shown herein, an operator can move the cursor control means in opposite directions with respect to first and second axes. Movement in opposite directions with respect to a first axis provides either incrementing or decrementing pulses on terminal 22 which respectively increment and decrement a horizontal cursor coordinate ($C_x$) register 24. Movement of the cursor control with respect to a second axis develops incrementing or decrementing pulses on terminal 26 to respectively increment or decrement a vertical cursor coordinate ($C_y$) register 28. Output terminals from registers 24 and 28 are respectively applied to AND gates 30 and 32. AND gates 30 and 32 are enabled by a state control device 34 when it defines a cursor display state. The outputs of gates 30 and 32 are respectively applied to horizontal (X) and vertical (Y) deflection registers 36 and 38. The outputs of registers 36 and 38 are in turn respectively coupled to digital to analog converters 40 and 42 to the horizontal and vertical deflection means of the cathode ray tube 16. Thus, whenever the state control device 34 defines a cursor display state, the cursor coordinate information stored in the registers 24 and 28 is transferred to the registers 36 and 38 to define the gross position of the cathode ray tube beam. By manipulating the cursor control means 10, an operator can thereby establish the gross position of the cursor at any point on the display surface. The cursor symbol can actually be generated by appropriately unblanking the beam and sweeping it short distances horizontally and vertically with respect to the gross position to draw the cross hair symbol 12. The cursor generator 44 provides the unblanking signal and horizontal and vertical sweep signals and is energized whenever the cursor display state is defined and after the beam is settled at the gross position defined by the contents of the registers 36 and 38.

It is pointed out that use of the term cursor herein is not intended to imply a symbol of particular configuration such as cross hairs. Rather, it should be appreciated that a symbol of any configuration can constitute a cursor and can be controlled by the system of the present invention. Moreover, it is pointed out that the cursor can even constitute a group of symbols or points which are to be moved as a unit.

Many different implementations of the cursor control means 10 can be utilized. As an example, attention is called to FIG. 2 which illustrates an exemplary cursor control of the type disclosed in U.S. Pat. No. 3,304,434. The cursor control of FIG. 2 is comprised of a ball 50 mounted (by means not shown) so that an operator is free to rotate it in any direction. A pair of rollers 52 and 54 which are oriented essentially transverse to one another are frictionally coupled to the ball so that as the ball 50 is rotated about a first axis 56, it rotates the roller 54. As the ball is rotated about a second axis 58, it rotates the roller 52. It should be apparent that regardless of the direction of rotation of the ball 50, the arrangement of the rollers 52 and 54 relative thereto will resolve the motion of the ball into components about the two essentially transverse axes, 56 and 58.

The rollers 52 and 54 respectively drive shafts 60 and 62 which in turn drive perforated discs 64 and 66. The disc 64 is positioned between a light source 68 and a pair of photocells 70 and 72. Similarly, the disc 66 is positioned between a light source 74 and a pair of photocells 76 and 78. As the ball 50 is rotated about the axis 58, the disc 64 is correspondingly rotated so that the photocells 70 and 72 are pulsed as the apertures in disc 64 move therepast. It will be appreciated that the accumulated number of pulses provided by the photocells 70 and 72 in a certain time interval represent the magnitude of movement of the ball around the axis 58 during that interval. The direction of movement of the ball 50 around the axis 58 is determined by which of the photocells 70 and 72 first senses the light source 68 as the apertures in disc 64 move therepast. As previously pointed out, the details of the cursor control of FIG. 2 are set forth in U.S. Pat. No. 3,304,434. It is only intended herein to show an exemplary device capable of being operator controlled to represent movement in opposite directions with respect to two substantially transverse axes.

As has been previously pointed out, it is not necessary to the present invention that the control means be perceptibly movable. For example, a control means could be utilized which is comprised of a "joy stick" to which the operator manually applies force. The "joy stick" may, without perceptibly moving generate output signals related to the applied force as by the use of strain gauges or very closely spaced capacitor plates. That is, the force exerted on the "joy stick" though not sufficient to perceptibly move it can be sufficient to vary a capacitor or effect a strain gauge. The change in capacitance or effect on the strain gauge can by well known techniques be converted into representative electrical signals.

Although the prior art cursor control system of FIG. 1 operates adequately to enable an operator to move the cursor 12 over the surface 14, it may appear to the operator to be sluggish when the operator desires to slew the cursor 12, that is to move it over a large distance. On the other hand, the operator may find that it is not as precise as he might desire for certain applications. As previously noted, these effects are essentially due to the fact that a fixed ratio has heretofore been used relating the amount of cursor control movement to the amount of cursor symbol movement. In accordance with a significant aspect of the present invention, a varying ratio is used to relate cursor control movement to cursor symbol movement with the particular ratio selected being dependent upon the rate of cursor control movement.

Figure 3:
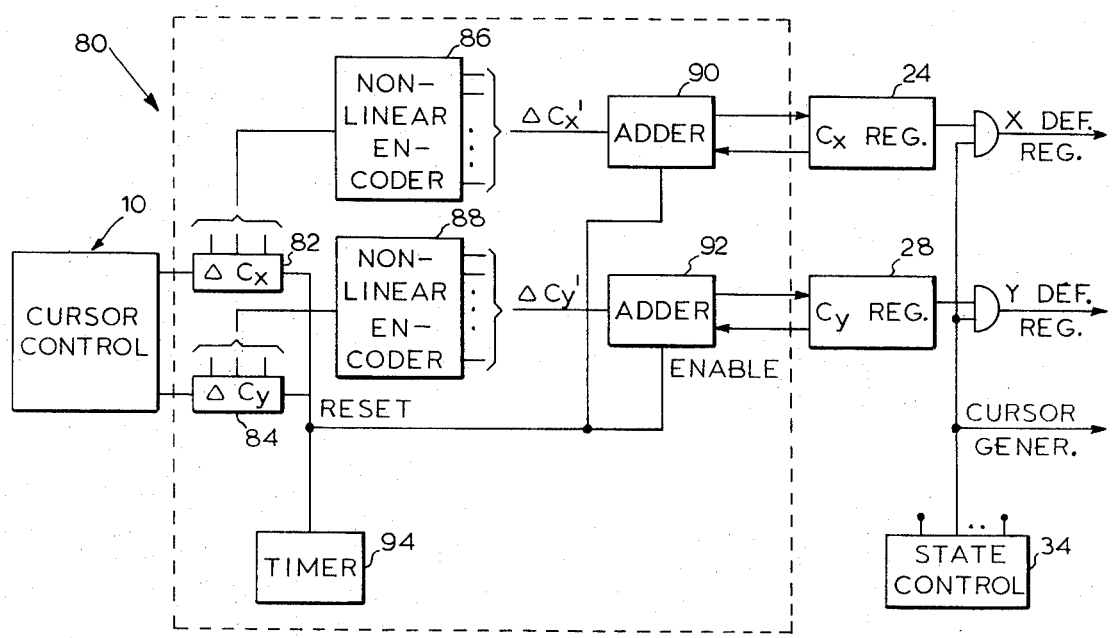
FIG. 3 is a block diagram illustrating a cursor control system in accordance with the present invention.

In accordance with the first embodiment of the invention as shown in FIG. 3, means 80 are incorporated between the cursor control means 10 and the cursor coordinate registers 24 and 28 for defining a varying ratio between the cursor control movement and the cursor symbol movement dependent upon the rate of cursor movement. The means 80 is comprised of horizontal and vertical incremental cursor coordinate registers 82 and 84. The registers 82 and 84 may be identical bidirectional counters. They may, for example, be comprised of three binary stages and be capable of defining seven distinct counts, i.e. from —3 to +3. The registers 82 and 84 are driven by the output of the cursor control means 10.

The outputs from the registers 82 and 84 are respectively coupled to the inputs of nonlinear encoders 86 and 88. The function of each nonlinear encoder is merely to accept a digital input signal from an incremental cursor coordinate register and provide an associated predetermined output signal. As an example, the encoder 86 may function in accordance with the following table:

TABLE I

| Sampled count: | Encoder output |
|---|---|
| —3 | —12 |
| —2 | —4 |
| —1 | —1 |
| 0 | 0 |
| +1 | +1 |
| +2 | +4 |
| +3 | +12 |

The outputs ($\Delta C_x'$ and $\Delta C_y'$) of the encoders 86 and 88 are respectively coupled to adders 90 and 92. Second inputs to the adders 90 and 92 are derived from the cursor coordinate registers 24 and 28. The outputs of the adders 90 and 92 are in turn supplied to the cursor coordinate registers 24 and 28 whose outputs in turn are utilized as in FIG. 1. A timer means 94 is provided to periodically reset the incremental cursor coordinate register 82 and 84 and to add the numbers provided by the encoders 86 and 88 representing the contents thereof to the registers 24 and 28.

Assuming that the encoders 86 and 88 function in accordance with the foregoing table, it will be appreciated that the apparatus of FIG. 3 will function to move the cursor symbol very rapidly when the cursor control is moved rapidly. For example, if the cursor control is moved rapidly, the incremental cursor coordinate register 82, when sampled by the timer 94, will define a maximum count of 3 (either + or —) thereby causing the encoder 86 to provide a count of 12 which is added to the contents of register 24 to effect a large change in the displayed position of the cursor symbol. On the other hand, if the cursor control is moved slowly, the incremental coordinate register 82 when sampled would define a lower count, e.g. 1, so that the encoder 86 would provide a count of only 1 for addition to the contents of register 24 thereby effecting a considerably smaller change in the displayed position of the cursor symbol. It will therefore be appreciated that by introducing means 80 between the cursor control means 10 and the registers 24 and 28 as shown in FIG. 3, the system will facilitate the operator's rapid and precise positioning of a cursor.

It will be noted in FIG. 3 that the timer 94 is independent of the state control device 34 of FIG. 3. This of course indicates that it is not necessary that the incremental cursor coordinate registers be sampled and reset in synchronization with the application of the cursor coordinate information to the deflection registers. However, in order to minimize the hardware, the timer device 94 can be deleted and the state control device 34 can additionally be utilized, as in FIG. 4, to reset the incremental cursor coordinate registers 82 and 84 and modify the cursor coordinate registers by the addition of the information provided by nonlinear encoders 86 and 88. Moreover, in the embodiment of FIG. 4, the arithmetic or adder means can be time shared. More particularly, the outputs of the nonlinear encoders 86 and 88 are coupled to the inputs of AND gates 96 and 98 which are both enabled when the cursor display state is defined by the control means 34. The outputs of the gates 96 and 98 are applied to adders 100 and 102. The cursor display state output terminal of control device 34 also controls gates 104 and 106, coupling the cursor coordinate registers 24 and 28 to the adders 100 and 102. Similarly, gates 108 and 110 coupling the outputs of the adders to the registers 24 and 28 are controlled by the state control device 34. It will therefore be appreciated that by coupling the encoders and cursor coordinate registers to the adders through gates controlled by the state control device 34, the adders 100 and 102 can be used during other states for operations other than modifying the cursor coordinates.

Figure 4:
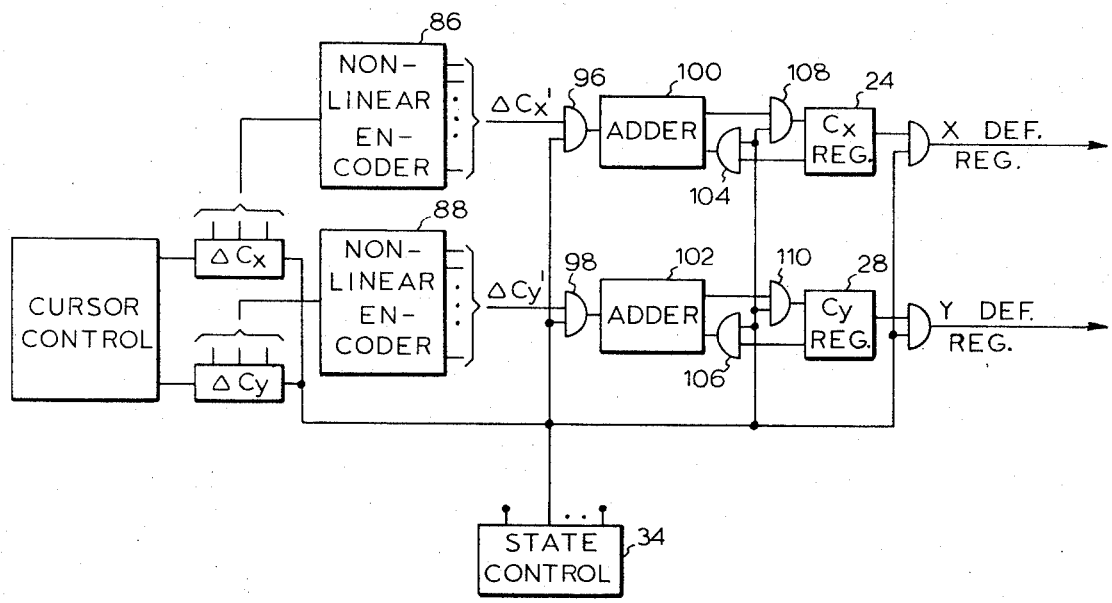
FIG. 4 is a block diagram illustrating an alternative embodiment of the present invention.
Figure 5:
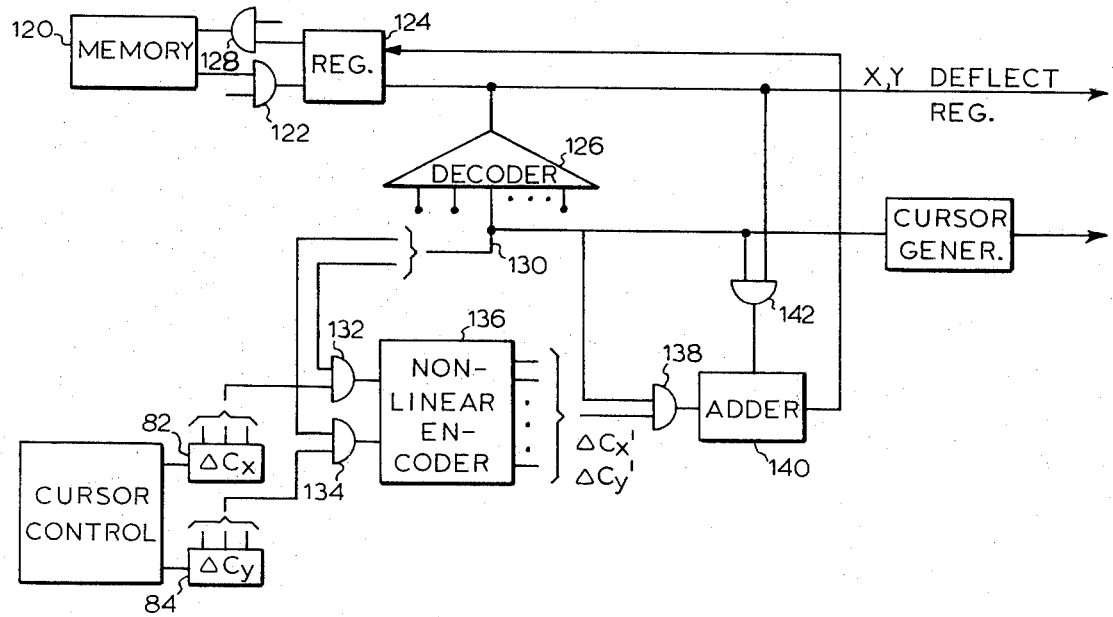
FIG. 5 is a block diagram illustrating a still further embodiment of the present invention.

In the embodiments of FIGS. 3 and 4, separate cursor coordinate registers 24 and 28 were provided. In the embodiment of FIG. 5, it is recognized that the horizontal and vertical cursor coordinate information can be stored in the same memory 120 which stores all the other information to be displayed on the display surface. The memory 120 is cyclically accessed at a rate sufficient to present a flicker-free display on cathode ray tube 12. U.S. Pat. No. 3,346,853 discloses a system in which both control and symbol information is stored in such a cyclically accessed memory. It is explained therein that control words accessed from memory are sometimes used to cause information emerging from the memory either simultaneously or subsequently to be interpreted in a certain manner, e.g. as horizontal and vertical coordinates. In the embodiment of FIG. 5, control information is stored in the memory which identifies either accompanying information or information to be subsequently accessed as the cursor coordinate information. For example, the information accessed from memory 120 in FIG. 5 is passed through gates 122 to an exchange register 124. The output from register 124 is applied to a decoder 126 and also through processing circuits to the X and Y deflection registers. Information read out of memory 120 is held for one cycle in register 124 and written back into memory by a gate 128 unless modified while in the register 124. In accordance with the embodiment of FIG. 5, the decoder 126 recognizes control information indicating that the horizontal and vertical cursor coordinate information is to be next accessed from memory 120 and in response thereto energizes terminal 130. Terminal 130 is connected to the input of gates 132 and 134 which couple the output of incremental cursor coordinate registers $\Delta C_x$ and $\Delta C_y$ to nonlinear encoder 136. The output of the encoder 136 is coupled to gate 138 to adder 140. The present cursor coordinate information accessed from memory and appearing in register 124 is also applied to the adder 140 through gate 142. The output of adder 140, constituting the sum of the original cursor coordinate information and the incremental information resulting from the movement of the cursor control, is coupled back to the register 124 and written into memory. It will thus be appreciated from the explanation of FIG. 5 that the cursor coordinate information stored in memory is updated once each memory cycle (e.g. sixty times per second) by adding thereto the incremental information in the incremental cursor coordinate registers loaded therein in response to cursor control movement.

Although three hardware implementations of the invention have been shown in FIGS. 3–5, it is recognized that the concept of the invention can be practiced in systems in which the display apparatus is controlled in response to a stored program device, e.g. a digital computer.

Figure 6:
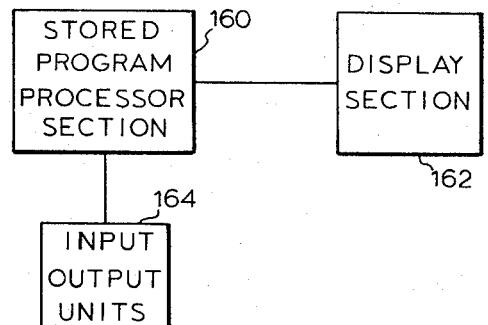
FIG. 6 is a block diagram of a stored program display apparatus.

FIG. 6 generally represents such a system in block diagram form. Briefly, such a display apparatus is comprised of a stored program processor section 160 which controls a display section 162 and receives information and provides information to input-output units 164.

Figure 7:
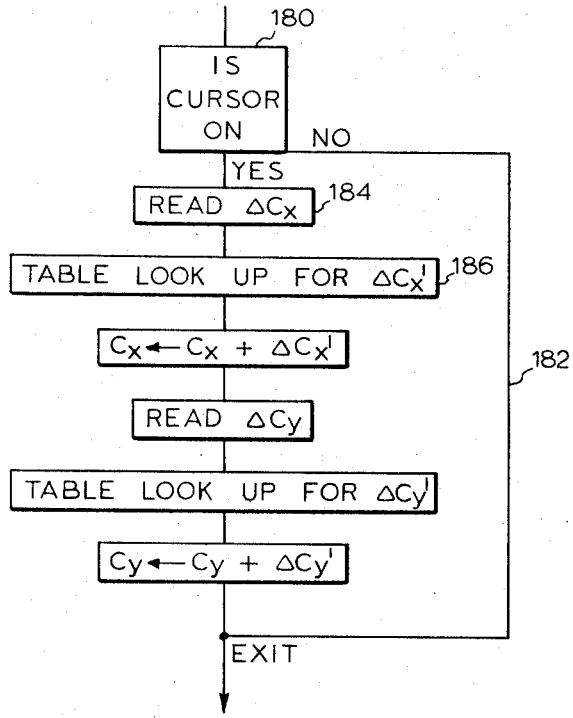
FIG. 7 is a flow chart representing the manner in which the apparatus of FIG. 6 can be programmed to operate in accordance with the present invention.

In order to implement the concept of the present invention in a display apparatus of the type represented in FIG. 6, the subroutine represented in FIG. 7 can be incorporated in the executive routine of the processor section.

Briefly, whether or not the subroutine of FIG. 7 is performed during each display cycle depends upon the decision represented by block 180, i.e. is the cursor on? If the response is no, the subroutine is avoided by a path 182. On the other hand, if the cursor is to be displayed, then the horizontal incremental cursor coordinate register is initially read (block 184). The table lookup operation represented by block 186 is next executed to derive a nonlinear correction $\Delta C_x'$ corresponding to the count $\Delta C_x$ previously read. After the table lookup operation is executed, the old horizontal cursor coordinate $C_x$ is accessed from memory and replaced by the algebraic sum $C_x + \Delta C_x'$ (block 188). Blocks 190, 192, 194 respectively correspond to blocks 184, 186, 188 but relate to updating the vertical cursor coordinate.

From the foregoing, it will be recognized that several cursor control system embodiments have been disclosed herein for responding to a manual control means for moving a cursor by an amount which is related to the control means output by some varying multiple which is dependent upon the rate of the control means output. Although the preferred embodiments of the invention were assumed to utilize physically movable control means, it is reiterated that the control means need not be physically movable. Rather, it is merely necessary that it be able to provide an output representing movement with respect to an axis, preferably movement in opposite directions with respect to orthogonal first and second axes. It is also reiterated that although digital counters, registers, and arithmetic means were utilized in the disclosed embodiments of the invention, these elements could be replaced by substantially equivalent analog devices without departing from the spirit of the invention.

The embodiments of the invention in which an exclusive property or privilege is claimed are defined as follows:

1. In combination with means defining a cursor element, a system for moving said cursor element, said system including:
 a cursor control means manually actuatable by varying amounts;
 means responsive to the actuation of said cursor control means for providing output signals representing the amount of actuation thereof;
 means responsive to said output signals for moving said cursor element a distance related by some multiple to said amount of actuation; and
 means responsive to the rate of variation of said manually actuatable cursor control means for automatically varying the value of said multiple in accordance therewith.

2. The combination of claim 1 wherein said cursor control means is mounted for manually actuated movement in opposite directions with respect to at least one axis; and wherein
 said means responsive to the actuation of said cursor control means provides output signals representing the amount of movement of said cursor control means about said axis.

3. The combination of claim 2 wherein said means for automatically varying the value of said multiple is responsive to the rate of movement of said cursor control means about said axis.

4. A control and display apparatus including:
 a display surface;
 means for forming a cursor on said display surface;
 coordinate storage means storing position information identifying a unique point on said display surface;
 means responsive to said position information stored in said coordinate storage means for deflecting said cursor to the unique point defined thereby;
 a cursor control means capable of being variably actuated;
 means responsive to the actuation of said cursor control means for generating information representing nonlinear function of the magnitude of said actuation; and
 means for modifying said position information in accordance with said information.

5. The apparatus of claim 4 wherein said cursor control means is mounted for manually actuated movement in opposite directions with respect to at least one axis.

6. The apparatus of claim 4 including a cathode ray tube having a screen comprising said display surface and a beam generating means comprising said means for forming said cursor.

7. The apparatus of claim 4 wherein said coordinate storage means includes a horizontal cursor coordinate register and a vertical cursor coordinate register.

8. The apparatus of claim 7 wherein said means responsive to said position information includes a horizontal deflection register and a vertical deflection register; and
 means for periodically transferring said information stored in said horizontal and vertical cursor coordinate registers to said horizontal and vertical deflection registers, respectively.

9. The apparatus of claim 4 wherein said cursor control means is mounted for manually actuated movement in opposite directions with respect to different first and second axes.

10. The apparatus of claim 9 wherein said means responsive to said movement of said control means includes a horizontal storage means and a vertical storage means;
 means responsive to movement of said control means in opposite directions with respect to said first axis for respectively increasing and decreasing the content of said horizontal storage means; and
 means responsive to movement of said control means in opposite directions with respect to said second axis for respectively increasing and decreasing the content of said vertical storage means.

11. The apparatus of claim 10 wherein said horizontal and vertical storage means respectively comprise horizontal and vertical incremental cursor coordinate digital registers.

12. The apparatus of claim 11 wherein said means responsive to said movement of said control means further includes nonlinear encoder means responsive to information stored in said horizontal and vertical incremental cursor coordinate registers; and wherein
 said modifying means includes arithmetic means responsive to said nonlinear encoder means modifying said position information stored in said coordinate storage means.

13. The apparatus of claim 12 wherein said modifying means further includes timing means for causing a periodic modification of said position information and for substantially simultaneously resetting said incremental cursor coordinate registers.

14. The apparatus of claim 13 including a cathode ray tube having a screen comprising said display surface and a beam generating means comprising said means for forming said cursor.

15. The apparatus of claim 14 wherein said coordinate storage means includes a horizontal cursor coordinate register and a vertical cursor coordinate register.

16. The apparatus of claim 15 wherein said means responsive to said position information in said coordinate storage means includes a horizontal deflection register and a vertical deflection register; and means for periodically transferring said position information stored in said horizontal and vertical cursor coordinate registers to said horizontal and vertical deflection registers, respectively.

17. The apparatus of claim 4 wherein said coordinate storage means comprises a digital memory including a plurality of word locations; and means storing said position information in one or more of said word locations.

18. The apparatus of claim 17 including means for periodically accessing said word locations storing said position information.

References Cited

UNITED STATES PATENTS

| | | |
|---|---|---|
| 2,275,026 | 3/1942 | Bedford. |
| 2,832,073 | 4/1958 | Arkus et al. |
| 2,873,405 | 2/1959 | Iwerks. |
| 2,942,147 | 6/1960 | Taubenslag et al. |

PAUL J. HENON, Primary Examiner

M. E. NUSBAUM, Assistant Examiner

U.S. Cl. X.R.

340—324.1; 343—5